Aug. 7, 1951 W. M. HOYT 2,562,917
METHOD AND APPARATUS FOR TESTING
PIEZOELECTRIC CRYSTALS
Filed June 23, 1947
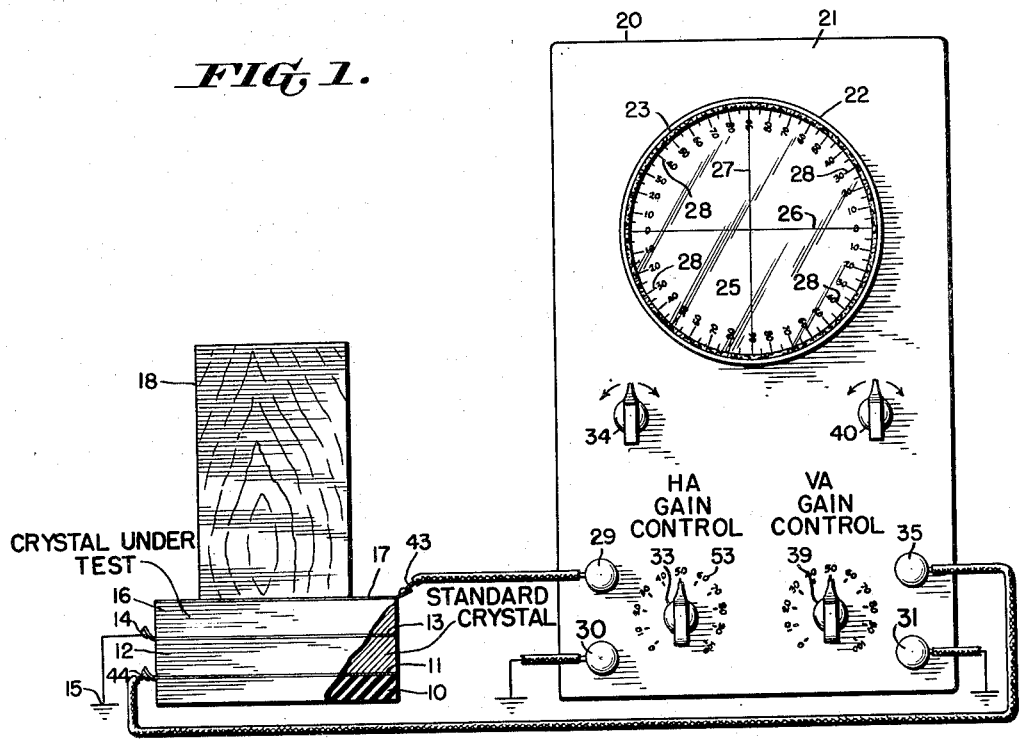
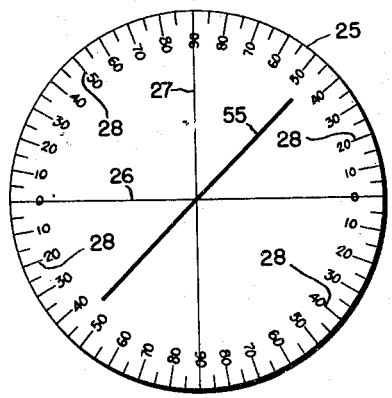
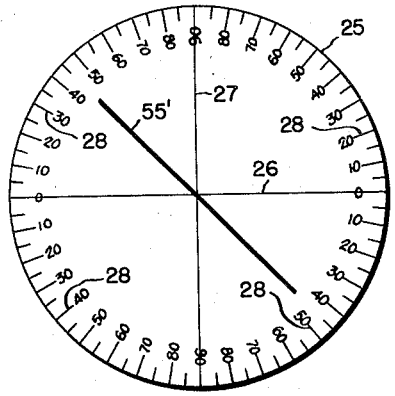
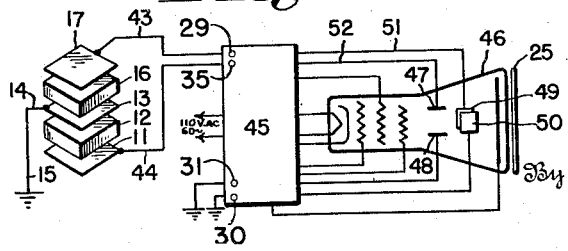
Inventor
W. M. Hoyt
Attorney Patented Aug. 7, 1951

2,562,917

UNITED STATES PATENT OFFICE 2,562,917

METHOD AND APPARATUS FOR TESTING PIEZOELECTRIC CRYSTALS

William M. Hoyt, Stanley, Iowa

Application June 23, 1947, Serial No. 756,537

6 Claims. (Cl. 175—183)

(Granted under the act of March 3, 1883, as amended April 30, 1928; 370 O. G. 757)

This invention relates to a method and apparatus for testing piezoelectric crystals. More particularly, the invention relates to determining the polarity and activity of piezoelectric crystals such, for example, as J-cut ammonium dihydrogen phosphate crystals, L-cut Rochelle salt crystals, and X-cut quartz crystals.

It is well known in the art that the polarity of a Rochelle salt crystal may be determined by connecting a D.-C. vacuum tube voltmeter to the electrodes of the crystal and applying mechanical pressure across a predetermined axis of the crystal. The indication of the vacuum tube voltmeter is a measure of the polarity, and to some degree, of the activity of the crystal. It has been found, however, that this method is not entirely satisfactory for testing ammonium dihydrogen phosphate and quartz crystals. Particularly in the case of the former, the conductivity of the crystal causes it to have an inherently small time constant such that the crystal will not hold a charge on its electrodes long enough to give a satisfactory reading on indicating devices, such as electrometers and vacuum tube voltmeters. The apparatus and method of the present invention are devised to obviate this difficulty.

The subject invention obviates the beforementioned disadvantages by providing an arrangement in which a standard crystal having known charateristics and the crystal to be tested are simultaneously subjected to equal stresses along predetermined axes thereof, and the voltages generated by the crystals are utilized to provide a visual indication of the relative characteristics of the crystals, as by application to the deflection circuits of a cathode ray oscilloscope whereby a trace is obtained on the screen which has characteristics determined by the relative polarities and activities of the two crystals.

An object of the invention is to provide an accurate method for testing piezoelectric crystals.

Another object of the invention is to provide a new and improved method for testing piezoelectric crystals which is applicable to all types and cuts of such crystals.

Still another object of the invention is to provide a new and improved method for testing a piezoelectric crystal which gives a positive indication of the polarity thereof, and is also satisfactory for measuring the degree of activity of the crystal.

A further object of the invention is to provide a new and improved method for testing piezoelectric crystals, in which the practice of the method will involve a minimum of apparatus.

Still a further object is to provide new and improved apparatus for visually comparing the activity of one crystal with that of another.

Still other objects, advantages, and improvements afforded by the invention will be apparent from the following description, taken in connection with the accompanying drawings, in which:

Fig. 1 is a view in elevation of apparatus according to the preferred embodiment of the invention and suitable for carrying out the method of the invention;

Fig. 2 is a view of the screen of the cathode ray oscilloscope as seen through a transparent scaling disc adjacent thereto, showing the trace on the screen for a predetermined polarity of the crystal under test with respect to the standard crystal;

Fig. 3 is a view similar to Fig. 2 but showing the trace on the screen of the cathode ray oscilloscope for a test crystal of opposite polarity; and Fig. 4 is a diagrammatic view of the complete electrical system of the apparatus of Fig. 1.

Referring now to the drawings, and to Fig. 1 in particular, there is here shown a shock absorbing base 10 composed of rubber or other suitable resilient material on which a reference or standard crystal 12 of known characteristics reposes with one of its mechanically vibrating surfaces positioned upwardly. A layer 13 of metal foil or other suitable electrode is placed over the upper face of the reference crystal 12 and is connected by a conductor 14 to ground as at 15. A test crystal 16, the polarity and activity of which are to be determined, is positioned on the electrode 13 with one of its mechanically vibrating surfaces in face to face relationship with crystal 12, and on the opposite or upper face of the crystal 16 there is placed another electrode 17 of metal foil or thin plate; a similar electrode 11 is placed on the under or second surface of the reference crystal 12. A block of wood 18 rests on the upper electrode 17 and is adapted to be struck by a hammer or other convenient means to create an instantaneous pressure on the crystal 16 under test, and also produce a substantially equal pressure simultaneously on the reference or standard crystal 12.

The electrode plate 17 adjacent the crystal 16 under test is connected by a conductor 43 to the terminal post 29 in the input circuit of one deflection amplifier, hereafter to be more fully described, of a cathode ray oscilloscope, for example, the horizontal deflection amplifier; similarly, the companion electrode plate 11 under the reference crystal 12 is connected by a conductor 44 to the input terminal post 35 of the other or vertical deflection amplifier of the cathode ray oscilloscope. The other terminal posts 30 and 31 of both deflection amplifiers are connected to ground.

The cathode ray oscilloscope is of generally conventional design and is enclosed by a cabinet 20 having a front panel 21, through which an enclosure member 22 projects. The enclosure member 22 is lined internally with a suitable resilient material such, for example, as an annular strip of felt 23, which serves to yieldably support a cathode ray tube 46, Fig. 4, therewithin. A scaling disc 25 of glass, plastic, or other transparent material is positioned within the enclosure member 22 and adjacent the end of tube 46, this disc having horizontal and vertical cross hairs or lines 26 and 27 respectively, which divide the disc into four quadrants. Each quadrant has disposed around its periphery a scale 28 calibrated in degrees.

Reference is made now to Fig. 4, which shows the electrical circuit of the apparatus of Fig. 2. As is well known in the art, when pressure is exerted upon a piezoelectric crystal along a predetermined axis thereof, a potential difference is caused to exist thereacross. The voltage generated by standard or comparison crystal 12 when pressure is applied thereto is developed across lead 44 and ground; the voltage generated by the crystal 16 under test, when pressure is applied thereto, is developed across lead 43 and ground. As before stated, leads 43 and 44 are connected at terminal posts 29 and 35 respectively to the input circuits of two deflection amplifiers, which are adapted to amplify respectively voltages existing between leads 43 and 44 and ground. These amplifiers may be of conventional design, and are included within the electrical apparatus generally designated in Fig. 4 by the block 45. For further details of construction, arrangement, and operation of a complete circuit conforming to the diagrammatic circuit of Fig. 4 and suitable for practicing the method of the present invention, reference may be had to the treatise on "Oscilloscopes" appearing on pages 405 and 406 of "The Radio Amateur's Handbook," 1944 edition. The amplifiers energized from leads 43 and 44 have gain controls 33 and 39 respectively, Fig. 1. The horizontal deflection amplifier energized from crystal 16 has its output connected by lead 51 to one of the horizontal deflection plates 49 and 50. The vertical deflection amplifier energized from crystal 12 and lead 44 has its output connected by lead 52 to the upper plate 47 of the vertical deflection plates 47 and 48. The electrical apparatus generally designated at 45 also includes means for applying a heating potential to the heater of cathode ray tube 46, and various accelerating and focusing potentials to the cathode, grids, and anode thereof. The circuits supplying these potentials also include means adjustable at will by knobs 34 and 40, Fig. 1, for adjusting the position of the electron beam vertically and horizontally in the absence of signals from crystals 12 and 16. It is contemplated that apparatus 45 will also include means (not shown) for adjusting the focus and intensity of the electron beam.

In operation, let it be assumed that the electron beam of tube 46 is properly centered at the junction of lines 26 and 27, and that the gains of the vertical and horizontal deflection amplifiers are adjusted by gain controls 39 and 33 respectively to be substantially equal. Under such a condition, a voltage applied between lead 43 and ground will cause a horizontal deflection of the electron beam from its center position by an amount equal to the amount of vertical deflection which an equal voltage applied between lead 44 and ground will cause. If two equal voltages are applied simultaneously to the two deflection amplifiers, the beam will be deflected from center at an angle of 45°, 135°, 225°, or 315°, depending upon the polarities of the two voltages.

Assuming now that the wooden block 10 is struck a sharp blow, as with a hammer, the impact stresses both the reference crystal 12 and the crystal 16 under test in substantially equal amounts. The position of the electron beam is then noted, with reference to the cross lines and scales of scaling disc 25.

The direction of the angular deflection of the electron beam is determined by the vector sum of the instantaneous electrostatic deflection forces exerted on the beam corresponding to the instantaneous voltages on the vertical and horizontal deflecting plates, which in turn are proportional to the voltages generated by crystals 12 and 16 respectively. Whereas the instantaneous voltages generated in the crystals upon impact of the hammer have predetermined polarities, it will be understood by those skilled in the art, that because of the nature of the crystals, and the presence of inductance and capacity in the input circuits of the amplifiers, oscillatory voltages of brief duration are set up. The alternating nature of the voltages generated accounts for the trace extending into two oppositely disposed quadrants on the scaling disc of the scope. It is understood that a cathode ray tube having a long persistence screen may be employed, if desired. It will be apparent that the beam deflection or trace appearing on the scaling disc 25, when the two crystals generate equal voltages, will be a substantially straight line inclined to the cross hairs at an angle of 45°, and in a direction depending on the relative polarities of the crystals. If the reference crystal should be of the greater activity, the angle between the trace and the horizontal cross hair 26 will be greater than 45°; conversely, if the crystal 16 under test should be of the greater activity, the angle between the trace and the horizontal cross hair 26 will be less than 45°. In either event, the angle that the beam deflection or trace makes with respect to the horizontal cross hair 26 on the scaling disc 25 may be read on the scales 28 on the disc. The polarity of the crystal 16 under test is indicated since, for a crystal giving a positive charge on electrode 17, assuming suitable and predetermined connections between the amplifiers and the deflection plates, the trace will appear in the first and third quadrants, for example, a trace 55 represented by Fig. 2, while, for a crystal giving a negative charge on electrode 17, the trace will appear in the second and fourth quadrants, for example, a trace 55' represented by Fig. 3. Since the angle which the trace makes with the cross lines 26 and 27 is an indication of the relative outputs of the test crystal 16 and standard crystal 12, it is evident that, the output or activity of the standard crystal being known, the output of the test crystal may be determined from the angular position of the trace, as indicated by scales 28. The ratio of the standard to the test voltage is proportional to the tangent of the angle between the trace and the horizontal hair 26. The disc 25 may also be calibrated in voltage ratios, if desired.

As a further method of operation, the crystals may be given repeated blows, and the gain of one amplifier, for example, the horizontal deflection amplifier, may be adjusted by gain control 33 until the angle of beam deflection is 45°, in which case, the gain of the other amplifier being shown, the relative activity of the test crystal may be determined directly from the gain setting of scale 53, suitable calibration of the scale 53 being made. It is obvious that the vertical deflection amplifier similarly could be calibrated and adjusted, if desired.

The invention contemplates the use, if desired, of a calibration or test circuit in the oscilloscope, which may be of conventional design, whereby test signals or voltages of known amplitude, for example, voltages obtained by a transformer from the 110 v. A. C. lines, may be inserted into the amplifier circuits for calibration purposes, as will be readily understood by those skilled in the art.

The invention contemplates the use, if desired, of automatic or mechanically operated means for applying stresses to the two crystals.

If desired, the fluorescent screen of the cathode ray tube or the scaling disc associated therewith may have the area thereof ruled in horizontal and vertical directions, so that the sides of the triangle, which represent the magnitudes of the voltages generated by the two crystals, can be obtained by dropping perpendiculars from an end of the trace, which represents the hypotenuse of a triangle in which the two voltages are represented in an aforementioned tangential relationship.

While there is shown and described herein a certain preferred embodiment of the invention which gives satisfactory results, modifications and other forms and uses will present themselves to those versed in the art without departing from the spirit of the invention, and I therefore, in the appended claims, include all such modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. The method of testing piezoelectric crystals which comprises simultaneously stressing equally a pair of stacked crystals, one of said crystals having known polarity and output characteristics, and utilizing the two voltages generated by the crystals under stress to provide a visual indication of the relative polarity and output characteristics of the crystals.

2. The method of testing a crystal which comprises placing the crystal under test upon a standard crystal of known characteristics whereby the crystals are maintained one above the other but are free to oscillate together along a common vertical axis and have electrodes individual thereto, striking the crystals a blow along said axis whereby the forces simultaneously applied thereto are substantially equal, and comparing the polarity and output voltage developed by the test crystal with the polarity and output voltage developed by the standard crystal as the forces are applied.

3. In apparatus of the character disclosed for measuring the activity of a piezoelectric crystal to be tested, a standard crystal of known activity, means for maintaining the crystal to be tested and standard crystal in predetermined axial relationship, means for applying equal stresses simultaneously to both of said crystals in response to a force received thereby, a cathode ray oscilloscope having vertical and horizontal deflection amplifier circuits of known gain, at least one of said amplifier circuits having the gain thereof manually adjustable, means for indicating the gain of said last named amplifier, means for applying the voltage developed by the test crystal when subjected to said stresses to one of said amplifier circuits, means for applying the voltage developed by the standard crystal when subjected to said stresses to the other of said deflection circuits, the gain of said one of the amplifiers being adjusted until the trace of said cathode ray tube caused by deflection of the beam in response to said voltages has a predetermined angle, the activity of said test crystal being measured in terms of the ratio of the gain of the amplifier excited thereby to the gain of the amplifier excited by the test crystal when said trace has said predetermined angle.

4. In apparatus of the character disclosed for measuring the activity of a piezoelectric crystal to be tested, a standard crystal of known activity, means for maintaining the crystal under test and standard crystal in predetermined axial relationship, means responsive to forces received thereby for applying substantially equal stresses simultaneously to both said crystals, a cathode ray oscilloscope having vertical and horizontal deflection circuits, said deflection circuits being adapted to give deflections in substantially equal amounts when equal voltages are applied thereto, means for applying the voltage developed by the test crystal when subjected to said stresses to one of said deflection circuits, and means for applying the voltage developed by the standard crystal when subjected to said stresses to the other of said deflection circuits, the angle of the trace of said cathode ray tube caused by deflection of the beam in response to said voltages indicating the activity of the crystal under test in terms of the ratio of its activity to the activity of the standard crystal.

5. In apparatus of the character disclosed for measuring the polarity and activity of a piezoelectric crystal to be tested, a standard crystal of known characteristics, a supporting member of resilient material, a first electrode mounted upon said member, one of said crystals being disposed upon said electrode in a predetermined axial position, a second electrode mounted upon said last named crystal, means for maintaining said test crystal upon said second electrode with the crystals in predetermined axial relationship to each other, a third electrode mounted upon said test crystal, a member mounted upon said third electrode and adapted to have pressure applied thereto thereby to stress both said crystals simultaneously in substantially equal amounts, a cathode ray oscilloscope having vertical and horizontal deflection circuits for the beam thereof, said deflection circuits being adapted to give beam deflections in substantially equal amounts when equal voltage are applied thereto, means for applying the voltage developed by the test crystal when subjected to said stress to one of said deflection circuits, means for applying the voltage developed by the standard crystal when subjected to said stress to the other of said deflection circuits, the angle of the trace of said cathode ray tube caused by the resultant angular deflection of the beam in response to the voltages from said crystals indicating the polarity of the crystal under test and providing a measurement of the activity of the crystal under test in terms of the ratio of its activity to the activity of the standard crystal, and scaling means associated with said cathode ray oscilloscope for indicating the angle of deflection of the beam.

6. The method of comparative testing of standard and test crystals having known and unknown characteristics respectively, comprising the steps of arranging the crystals in stacked relation with the piezoelectric axes thereof coinciding and with electrodes individual thereto, instantaneously transmitting stresses along said axes from one crystal to the other thereby to stress the crystals equally, and utilizing the two voltages generated by the crystals under stress to provide a visual indication of the relative polarity and output characteristics of the crystals.

WILLIAM M. HOYT.

REFERENCES CITED

The following references are of record in the file of this patent:

UNITED STATES PATENTS

| Number | Name | Date |
| --- | --- | --- |
| 1,866,454 | Dawson | July 5, 1932 |
| 2,275,256 | Fried | Mar. 3, 1942 |
| 2,320,476 | Schrader et al. | June 1, 1943 |
| 2,406,405 | Salisbury | Aug. 27, 1946 |

OTHER REFERENCES

Journal of Optical Society of America and Review of Scientific Instruments, vol. VI, March 1922, pages 183–185.

Hund, High Frequency Measurements, McGraw-Hill Book Co.; 1933, page 425.